(12) United States Patent
Kelley et al.

(10) Patent No.: US 7,347,089 B1
(45) Date of Patent: Mar. 25, 2008

(54) GAS VOLUME CONTENTS WITHIN A CONTAINER, SMART VOLUME INSTRUMENT

(75) Inventors: Anthony R. Kelley, Madison, AL (US); Paul D. Van Buskirk, Humble, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 88 days.

(21) Appl. No.: 11/215,749

(22) Filed: Aug. 30, 2005

(51) Int. Cl.
*G01F 17/00* (2006.01)
(52) U.S. Cl. .................... 73/149; 73/861.42
(58) Field of Classification Search .................. 73/149
See application file for complete search history.

(56) References Cited

U.S. PATENT DOCUMENTS

| | | | |
|---|---|---|---|
| 4,462,249 A | 7/1984 | Adams | |
| 4,827,762 A | 5/1989 | Hasselmann | |
| 4,852,054 A | 7/1989 | Mastandrea | |
| 4,901,245 A | 2/1990 | Olson et al. | |
| 4,928,525 A | 5/1990 | Aderholt et al. | |
| 5,001,924 A * | 3/1991 | Walter et al. ................ | 73/149 |
| 5,237,852 A | 8/1993 | Kolpak | |
| 5,309,760 A * | 5/1994 | Watanabe et al. ............ | 73/149 |
| 5,363,093 A | 11/1994 | Williams et al. | |
| 5,471,867 A | 12/1995 | Tuma et al. | |
| 5,531,111 A | 7/1996 | Okamoto et al. | |
| 5,870,695 A | 2/1999 | Brown et al. | |
| 5,899,962 A | 5/1999 | Louwagie et al. | |
| 5,925,829 A | 7/1999 | Laragione et al. | |
| 6,038,919 A | 3/2000 | Schmitt et al. | |
| 6,062,066 A | 5/2000 | Loen | |
| 6,321,597 B1 | 11/2001 | Demers et al. | |
| 6,401,045 B1 | 6/2002 | Rogers et al. | |
| 6,485,263 B1 | 11/2002 | Bryant et al. | |
| 7,114,384 B1 * | 10/2006 | Bates et al. .................... | 73/149 |

FOREIGN PATENT DOCUMENTS

| | | |
|---|---|---|
| EP | 0955535 A2 | 10/1999 |
| FR | 2682185 | 4/1991 |
| JP | 63261114 A2 | 10/1988 |
| JP | 6215956 A2 | 8/1994 |
| JP | 7055534 A2 | 3/1995 |
| WO | WO 83/02321 | 7/1983 |
| WO | WO 88/04031 | 6/1988 |
| WO | WO 91/08445 | 6/1991 |
| WO | WO 95/17652 | 6/1995 |
| WO | WO 02/079731 A1 | 10/2002 |
| WO | WO 03/006975 A1 | 1/2003 |

* cited by examiner

*Primary Examiner*—Hezron Williams
*Assistant Examiner*—Paul M West
(74) *Attorney, Agent, or Firm*—James J. McGroary; Anthony P. Venturino

(57) ABSTRACT

A method for determining the volume of an incompressible gas in a system including incompressible substances in a zero-gravity environment. The method includes inducing a volumetric displacement within a container and measuring the resulting pressure change. From this data, the liquid level can be determined.

17 Claims, 4 Drawing Sheets

GAS VOLUME CONTENTS WITHIN A CONTAINER, SMART VOLUME INSTRUMENT

ORIGIN OF THE INVENTION

The invention described herein was made in part by an employee of the United States Government and may be manufactured and used by or for the Government of the United States of America for governmental purposes without the payment of any royalties thereon or therefor.

BACKGROUND OF THE INVENTION

1. Field of the Invention

This invention relates to methods and apparatus for ascertaining the volume of liquid in a container or tank, and more particularly to a system of gauging liquid volumetric quantities based upon the properties of a gas and is operable in any gravity environment, including zero gravity environment.

2. Background

On the Earth, gauging systems for measuring liquid and gas quantities in a tank invariably rely on the Earth's gravitational field to separate the gas and liquid phases in a consistent and predictable manner. This type of separation provides a flat, or predictable interface of the gas and liquid phases from which volumetric measurements can be made. Current state-of-the-art measurement instruments are designed to locate this separation interface by some measured or inferred change in physical property. Knowledge of the storage tank geometry is then used to calculate the respective volumes of gas and liquid.

In a zero-gravity or weightless environment, however, the gravitational or acceleration body forces are absent, which introduces a number of concerns due to the behavior of the individual phases, both dynamic and static, and the effect on contents gauging systems. These effects may include:

1. no stable, known positioning or interface; configurations can take multiple geometries and this can result in multiple random distribution of interface locations;
2. for certain designs, wetting of sensor surfaces disables measurement capabilities;
3. loss of calibration. A calibration loss in a zero-gravity environment may make the system in-operative since calibration is based upon a fixed, known geometry of the materials in the contained system;
4. point sensor systems may not provide a true picture of the phase locations unless multiple sensors are used and statistical approaches are utilized. Continuous, total body systems require multiple detectors uniformly distributed over the container surface; and
5. temperature and/or composition variations (stratification) can cause significant variations in measurement accuracy.

Because of these effects, current methods for zero-gravity tank gauging are limited to single phase storage (either gas or supercritical) or rely on flow rate measurements into or out of the tank in the case of single phase storage, considerable weight is added to the structure since these systems must be designed for high pressure storage. Alternatively, pressure monitoring systems are used to estimate volume as a function of pressure with poor accuracy. These systems cannot function in the presence of a leak.

Use of inlet/outlet flow gauging measurement may not provide a reliable (accurate) estimate of the tanks liquid contents due to the following restrictions:

1. Two-phase flow. Most flow metering systems are designed to handle single phase systems. Two-phase metering designs are limited in application.

2. Turn-down (range limitations). The turndown range of most flow gauging systems is at best 20 to 1. Non-steady state applications of these instruments is significantly limited.

3. System leaks. Storage tank leaks would go undetected since no direct means are available for contained liquid volume measurement.

In the present invention, the contents in a two phase system including a compressible gas and an incompressible substance are measured independent of the shape of the container or tank and independent of temperature. In another important aspect of the present invention, the ratio of specific heat constants can be obtained in a relatively simple fashion. There are many chemical, manufacturing and mechanical applications where volume measurements are needed. These volumetric measurements are to ascertain the gas, liquid, and/or solid contents within a container. There are many instances where the current technology applications are not appropriate, such as in zero or low gravity applications, certain high-pressure applications, with toxic and/or explosive chemical applications, and with underground cavern storage facilities.

Current technologies include level height measurements, sonic measurements, capacitance measurements, and nuclear radiative measurements. All of these technologies rely on the fluid in a state of quiescent liquid level produced by the effects of gravity on the system. In zero or low gravity applications, the fluid may not be so constrained.

U.S. Pat. Nos. 3,237,451, 3,413,847 and 3,769,834 all disclose methods to determine the volume of gases in tanks in a zero gravity situation. In U.S. Pat. No. 3,237,451, an acoustic system is utilized for generating pressure changes which are related to volume measurements. In U.S. Pat. No. 3,413,847, density of a gas is measured and related to volume measurements. In U.S. Pat. No. 3,769,834, the volume of a human body is measured by changes in pressure.

U.S. Pat. No. 3,585,861 discloses a system for determining volume of gases by using a reference gas pressure. U.S. Pat. No. 4,072,050 utilizes thermal energy changes for measuring volume. U.S. Pat. No. 4,384,925 utilizes electrochemical sensing procedures for measuring volume. U.S. Pat. No. 4,726,216 relates to a calibration circuit for detecting "HC" gases. U.S. Pat. No. 4,781,061 relates temperature to volume measurements. Each of the above-identified are herein incorporated by reference in its entirety.

In 1 g applications, the gauging methods may be inappropriate due to the location of the container, such as an underground cavern or may not be able to be mechanically capable or safe for measuring certain fluids. Additionally, waves, bubbles, froth or foam may interfere with these measurements, and no device known is capable of measuring the gas contents in a vessel as a direct measurement.

Within the fluid-chemical process industries, there is a significant need to improve tank and vessel gauging capabilities. The bulk of current designs include differential pressure for liquid level, sonar, radar, load cells, radiation, capacitance, etc., which can be expensive and require extensive calibration and maintenance requirements. These systems have also proven to be unreliable or unsuitable for certain applications and are typically highly dependent on fluid properties and process conditions. In zero-G environments, where the solids or liquids may float within the containment volume, none of these systems works suitably or accurately.

Thus, the conventional methods and devices lack (1) the capability to get an accurate volume measurement, 2) the ability to accurately measure container contents without a definable phase interface, 3) the ability to be applied to different container volumetric requirements, shapes, and internal features, and 4) the ability to accurately measure and self-calibrate the volumetric equations for highly accurate metering capabilities.

SUMMARY OF THE INVENTION

Thus the present invention has (1) the capability to get an accurate volume measurement, 2) the ability to accurately measure container contents without a definable phase interface, 3) the ability to be applied to different container volumetric requirements, shapes, and internal features, and 4) the ability to accurately measure and self-calibrate the volumetric equations for highly accurate metering capabilities.

By utilization of particular equations, the system is said to be constrained, in that the number of equations will equal the number of constants to be determined. This allows no-degrees of freedom with this analysis which was a failing of the system of U.S. Pat. No. 5,001,924 (herein incorporated by reference in its entirety).

New revelations have shown the gas models to be used for the frequency change of the volume displacement to adequately provide the regions of isothermal, adiabatic, isobaric, isentropic and other thermodynamic processes that are used herein.

DETAILED DESCRIPTION

Figure 1:
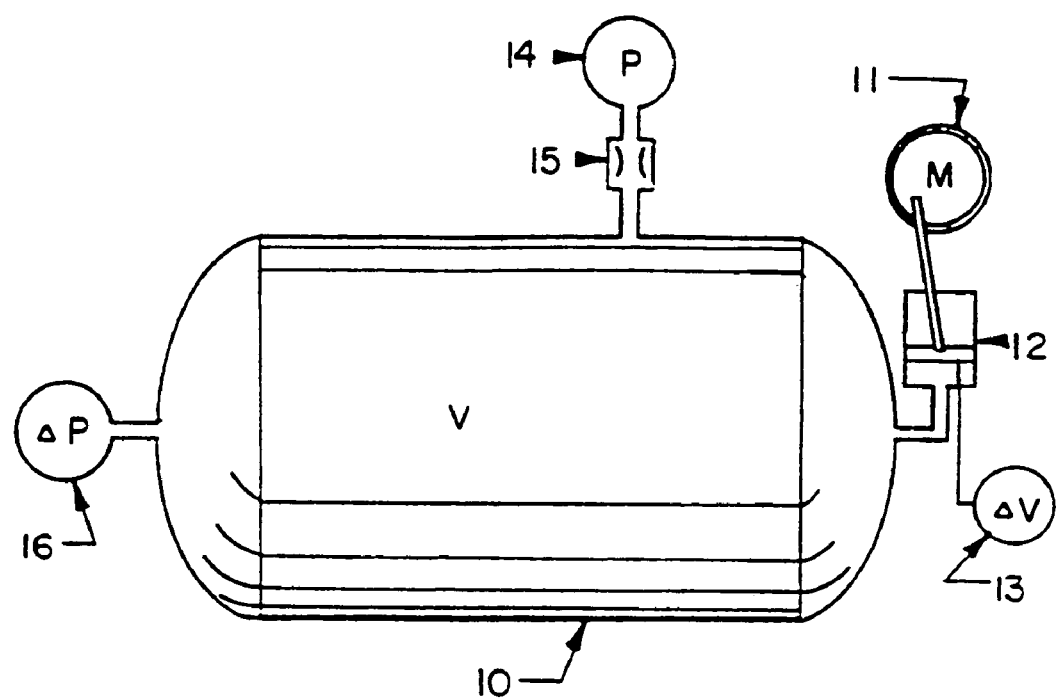
FIG. 1 illustrates a tank and measuring apparatus for practicing the invention.

The method and device of the invention measures the gas volume within the containment volume. With a known empty vessel or reference containment volume, the liquid or solid contents can then be determined. The fundamental equation is:

$$V_C = V_T - V_G \qquad \text{EQ1}$$

where,
 $V_C$=the solid or liquid volumetric contents
 $V_T$=the reference or empty tank volume
 $V_G$=the gas volume.

Where the contents are liquid, the term $V_C$ is often substituted with LL. Thus, $V_C$ and LL can be used interchangeably.

The gas volume can be determined analytically by the following method:

From the basic Gibb's thermodynamic relation, $$\Delta S = 1/T \Delta U + P/T \Delta V_G \qquad \text{EQ2}$$

where,
 $\Delta S$=the differential entropy change
 $\Delta U$=the differential energy change
 $\Delta V_G$=the differential gas volume change
 T=the absolute temperature
 P=the absolute pressure
 And using the ideal gas equation, $$PV_G = nRT \qquad \text{EQ3}$$

where,
 P=the absolute pressure
 $V_G$=the gas volume
 n=the number of moles
 R=the gas constant
 T=the absolute temperature With the ideal gas relation for heat capacities, $$C_P = C_V + R \qquad \text{EQ4}$$

where,
 $C_P$=the constant pressure heat capacity of the gas
 $C_V$=the constant volume heat capacity of the gas
 R=the gas constant.

The above three equations can be combined to the following form for an isentropic (constant entropy) process:

$$V_G = -KP \Delta V_G / \Delta P \qquad \text{EQ5}$$

with, $$K = C_P / C_V \qquad \text{EQ6}$$

For an isothermal condition, it can be shown that K=1, and the gas volume equation is, $$V_G = -P \Delta V_G / \Delta P \qquad \text{EQ7}$$

These equations show that the volume of the gas can be determined from a volumetric displacement, pressure change, and the total pressure. This applies for any geometry, gravitational environment, and without the information of where the liquids or solids are located within the containment volume. Additionally, this applies in the presence of small leaks or relatively small vents as in vented tank systems.

The tank contents equation is then given by, $$V_C = V_T + KP dV_G / dP \qquad \text{EQ8}$$

where K typically ranges from one (1) to $C_P/C_V$ dependent on the thermodynamic path taken, e.g. isothermal, polytropic, or adiabatic.

From this simple and unique relation, the solid or liquid contents ($V_C$) can be determined from the empty or reference tank volume ($V_T$) and the gas-volume measurement correlation (K P $\Delta V_G/\Delta P$).

With liquid-level data, the following relation provides the defining equation in a reduced and dimensionless form:

$$LL/LL_1 = (P_0/\Delta P_0 - P/\Delta P)/(P_0/\Delta P_0 - P_1/\Delta P_1) \qquad \text{EQ9}$$

where,
 LL=the measured liquid level
 P=the absolute pressure
 $\Delta P$=the peak differential pressure The subscript numbers zero (0) and one (1) refer to the measured values (LL, P, and ΔP) at the referenced minimum liquid level, point 0, and the maximum referenced liquid level, point 1.

The following steps illustrate a preferred embodiment to calculate an unknown liquid level (LL) in a container. Initially, the system is calibrated by running the system and measuring the changes in pressure at two reference liquid levels. A typical calibration method is as follows:

1. Fill the container to a first known liquid level ($LL_0$).
2. Measure the initial pressure ($P_0$) in the container.
3. Produce a volumetric displacement in the container and measure the resulting change in pressure ($\Delta P_0$).
4. Add liquid to the container to a second known liquid level ($LL_1$).
5. Measure the initial pressure ($P_1$) in the container.
6. Produce a volumetric displacement in the container and measure the resulting change in pressure ($\Delta P_1$).

At any time after the calibration, the unknown liquid level (LL) is preferably determined as follows:

7. Measure the initial pressure (P) in the container.
8. Produce a volumetric displacement in the container and measure the resulting change in pressure (ΔP).
9. Use the following formula to calculate LL:

$$LL = LL_1 (P_0/\Delta P_0 - P/\Delta P)/(P_0/\Delta P_0 - P_1/\Delta P_1) \qquad \text{EQ10}$$

In a preferred embodiment, the initial pressures ($P_0$, $P_1$, and P) are equal, such as atmospheric pressure, but such is not necessary.

Additionally, as a percentage of maximum measured liquid level, $$LL\% = 100 LL/LL_1 \qquad \text{EQ11}$$

With this relation, the K's and dV's cancel out when the displacement volume and frequency are constant.

For a real gas, (with any composition and at any process conditions, i.e. at any pressure and temperature) the following equation applies:

$$K = 1 + ZR/C_V \qquad \text{EQ12}$$

This is derived for an isentropic process using an average for the constant-volume specific heat ($C_V$) and the real-gas equation, $$PV_G = nZRT \qquad \text{EQ13}$$

where,
P=the absolute pressure
$V_G$=the gas volume
n=the number of moles
Z=the gas compressibility factor
R=the gas constant
T=the absolute temperature However, with constant volume displacement, constant displacement frequency and similar process conditions, the K's (and dV's) will cancel as in the ideal-gas case.

In functioning, the device of the invention causes a known differential volume which creates a measurable differential pressure and temperature. By use of non-ideal fluid equations-of-state and thermodynamic work relations, the gas and/or vapor volume within a vessel can be determined. The equations will solve automatically for the coefficients used in the thermodynamic equations.

These coefficients may include, but are not limited to, the polytropic coefficient and gas compressibility. The polytropic coefficient is supplemented by the gas $C_P/C_V$ coefficient by direct measurement of the fluid sound velocity.

Figure 2:
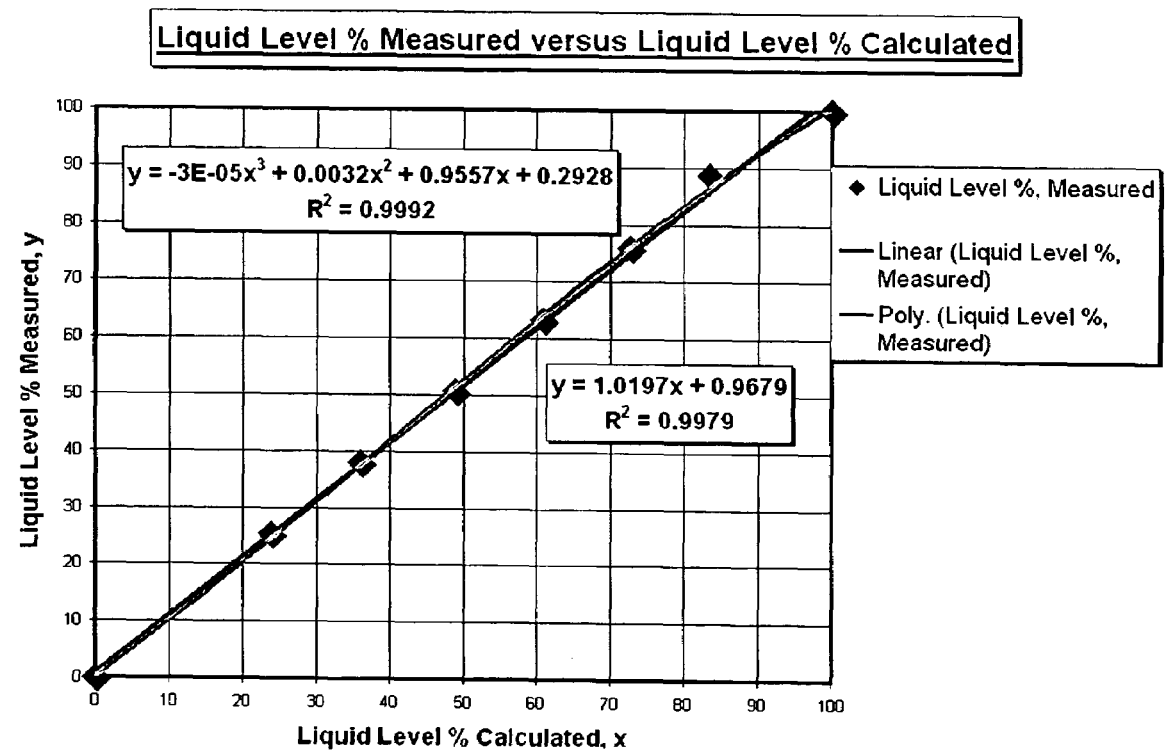
FIG. 2 is a graph showing show liquid level percent calculated versus liquid level percent measured, when the calculations of the invention are used.

A new and novel Tank Gas Volume Measurement System design has been tested and shown to be accurate in determining the liquid contents in a vessel. Industrial tank gauging measurement devices are typically within plus or minus five percent (+/-5%) with calibration. Results for this new design are as shown in FIG. 2. The purpose of the data in the Liquid Level Calculated column is for calibration purposes or may be used independently.

The accuracy of this design is within +/-0.21 percent on a linear ($R^2$) basis. On a polynomial basis, the error is +/-0.08 percent. This is well within current measurement accuracy requirements and provides significant improvement in the use of this design versus current industry technologies. It should be noted that the measured average differential pressure (dP) was estimated by graphical methods. Improved accuracy will be accomplished through computerization of this system. Additionally, no adjustments were made for air/water composition and temperature conditions (i.e. the K (and dV) factors were canceled from the liquid level relation). Last, these equations performed suitably in the presence of a tank atmospheric vent and in the presence of a small system leak.

Referring first to FIG. 1 for orientation relative to physical apparatus, a tank 10 of a known volume V contains a compressible gas and incompressible substances (i.e., liquids and/or solids). A motor 11 drives a volume displacement device 12 which may be a bellows, diaphragm, piston etc. that is driven in a known linear or oscillating manner to produce a known volume change (ΔV) in the tank. The resulting pressure change (ΔP) is a function of the compressibility factor "N" of the gas. The change in volume can be measured by a ΔV volume measuring device 13. A total pressure gauge device 14 measures the mean pressure in the tank and is coupled to the tank 10 but isolated from instantaneous pressure changes by a snubber 15, if required. A ΔP pressure measuring device 16 measures the change in pressure. The motor displacement 11, 12 produces a constant value of change in volume ΔV in a time period Δt where the time Δt can be varied for the known change in volume ΔV.

Although the invention is described as being usable in a simple tank for determining the liquid level therein, the system can be used in a variety of environments to determine the number or volume of the contents of a variety of containers. Additionally, as described above, the system need not be sealed, as a small leak, up to for example, 50%, typically less than approximately 20%, preferably less than about 15% and more preferably less than about 10%, may be present, depending upon the sensitivity of the equipment being used.

A preferred system can be used to determine heat loads for air conditioning systems. For example, if the container were a building, such as an office building, warehouse, school or apartment building or even a habitat or other structure outside the earth's atmosphere, be it in orbit or elsewhere, assuming an average volume for a person, one could easily convert the calculated LL into a number indicating the number of people present in the building. The same calculations can be used for passenger or commercial vehicles, such as busses, airplanes, trains and cars. In one embodiment, a car or home, can have a climate control system, and based on the number of people in the home or car, adjust the output of the heating/air conditioning system to account for the number of people. Similarly, the container can be an oven or other heating device, such as a microwave, which can use the volume of the object to be heated to control the heat output of the device.

Test Facility and Procedure

Figure 3:
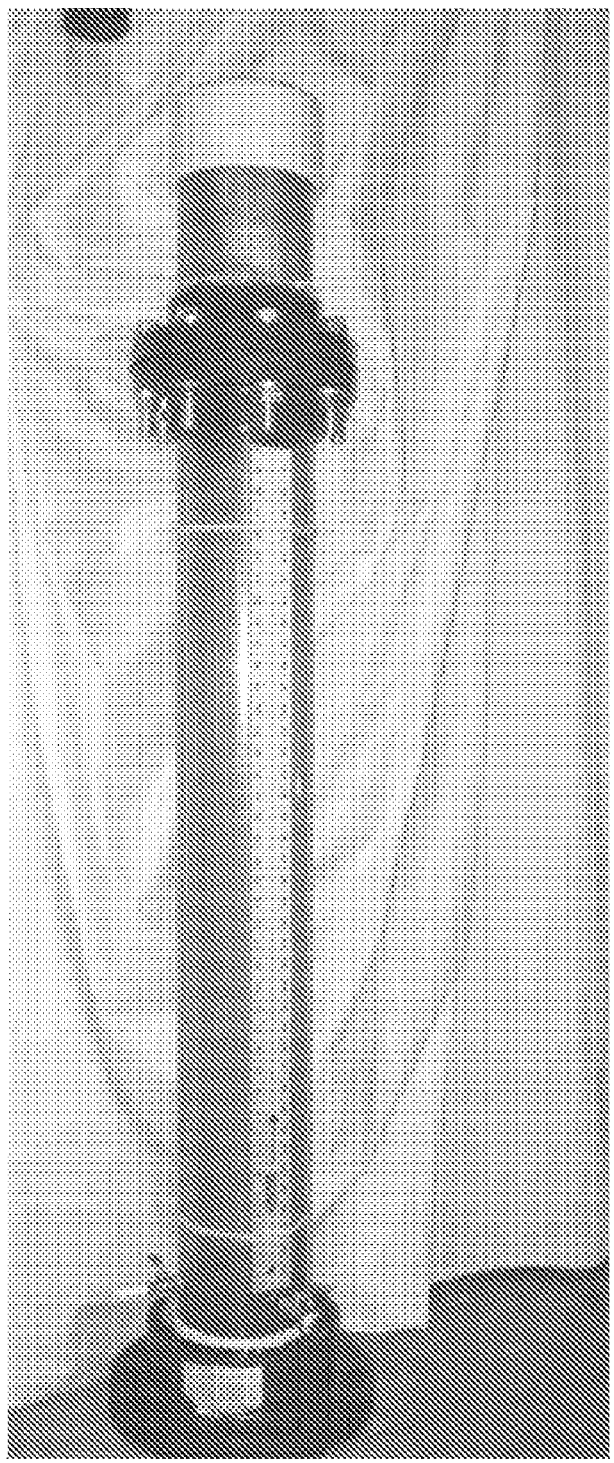
FIG. 3 is picture of the flow sheet test stand used in the invention.
Figure 4:
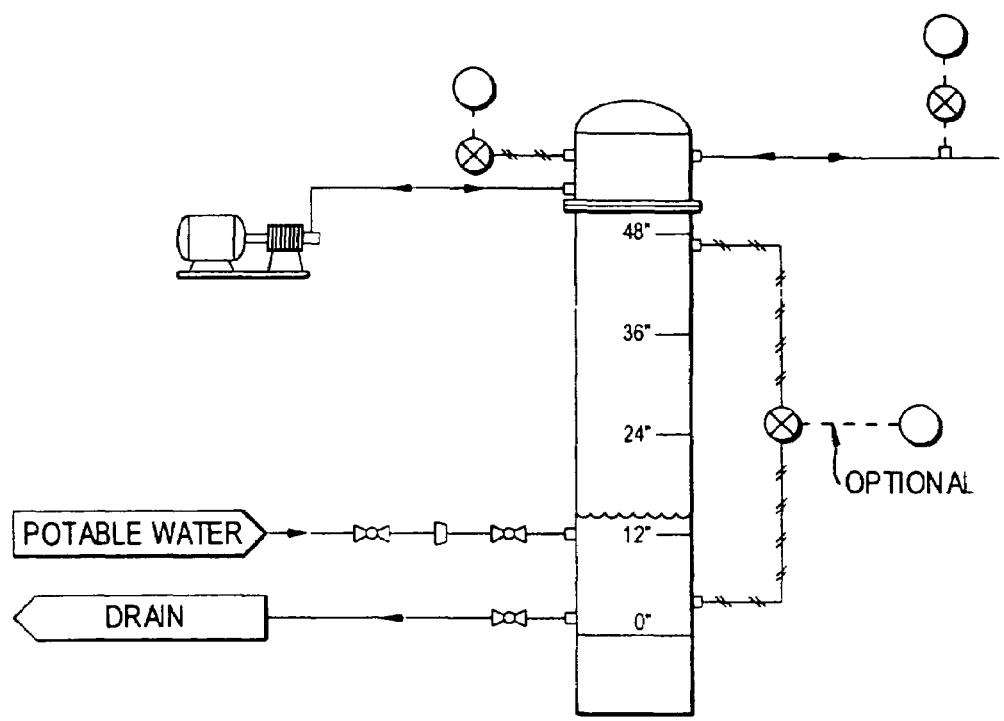
FIG. 4. shows a tank gas volume measurement flow sheet in accordance with the invention.
Figure 5:
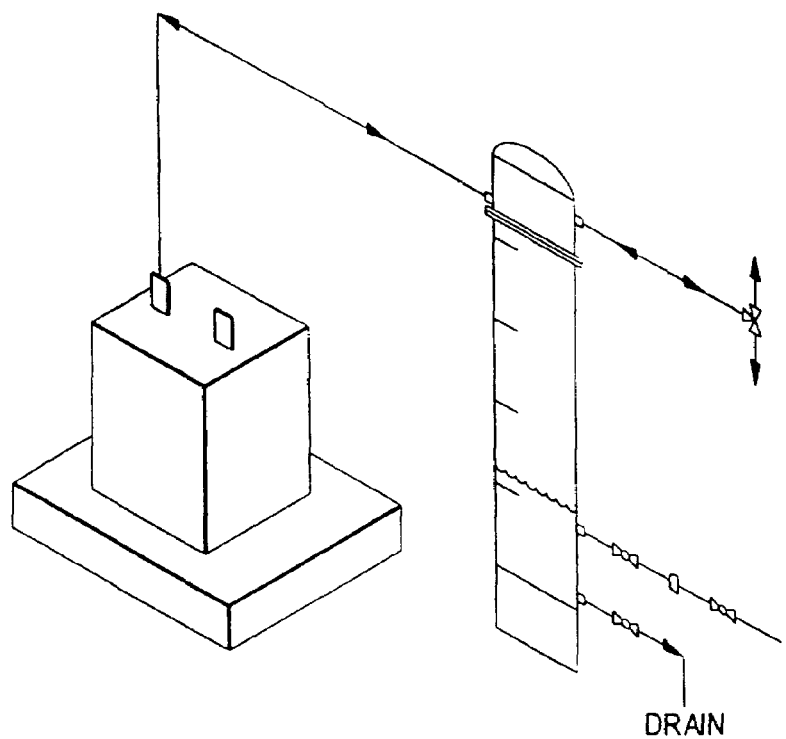
FIG. 5. shows another view of a tank gas volume measurement system in accordance with the invention.

The Tank Gas Volume Measurement System test stand is comprised of a clear PVC tank, six inches (6") in diameter and approximately five feet (5') tall. Instrumentation included delta-pressure and pressure gauges, ruler for liquid level measurement, a volumetric displacement device, and temperature gauges. Monitoring of the data was with LabView for data acquisition and storage. A picture of the flow sheet test stand is shown in FIG. 3. A flow sheet of the test stand is shown in FIG. 4.

The following Tables present the data obtained from the procedure, and the equations used to calculate the liquid level:

TABLE 1

Tank Gas Volume Measurement System - Measured Data
Measured Data

| Water Level, inch | Delta Pressure, psi | Tank Pressure, psia |
|---|---|---|
| 0 | 0.126 | 14.68115 |
| 10 | 0.152 | 14.67597 |
| 15 | 0.17 | 14.67274 |
| 20 | 0.194 | 14.66253 |
| 25 | 0.224 | 14.67004 |
| 30 | 0.264 | 14.65639 |
| 35 | 0.316 | 14.66590 |
| 39.5 | 0.45 | 14.67634 |

TABLE 2

Tank Gas Volume Measurement System - Liquid Level Equations
Liquid Level Equations
Liquid Level % = A − B * Pressure/Δ Pressure
Adjusted (Avg) Value

| | |
|---|---|
| LL/LLmax = (Vgo − Vg)/ (Vgo − Vg@LLmax) | LL/39.5 = (Po/dPo)/(Po/dPo − P@maxLL/dP@maxLL) − |
| Vg = K * P * dV/dP | (P/dP)/(Po/dPo − P@maxLL/dP@maxLL) |
| Vgo = Vtank(@LL = 0) = K * Po * (dV/dPo) | |
| Vliquid = Vtank − Vgas | |

Note: dVs and Ks cancel out . . .

TABLE 3

Tank Gas Volume Measurement System - Calculations
Calculations

| Liquid Level %, Measured | A | B | B * Pres/ΔP | Liquid Level % Calculated |
|---|---|---|---|---|
| 0 | 138.8711808 | 1.191852648 | 138.8711808 | 0 |
| 25.3164557 | 138.8711808 | 1.191852648 | 115.0762719 | 23.79490893 |
| 37.97468354 | 138.8711808 | 1.191852648 | 102.8690865 | 36.00209428 |
| 50.63291139 | 138.8711808 | 1.191852648 | 90.08027436 | 48.79090643 |
| 63.29113924 | 138.8711808 | 1.191852648 | 78.05590356 | 60.81527723 |
| 75.94936709 | 138.8711808 | 1.191852648 | 66.16765727 | 72.70352352 |
| 88.60759494 | 138.8711808 | 1.191852648 | 55.3151608 | 83.55601999 |
| 100 | 138.8711808 | 1.191852648 | 38.87118079 | 100 |

Additionally, modification of the formulae described above can be used to determine the rate of change of the measured fluids or solids. By manipulating the above-formulae, the following was determined:

$$Vg\left(\frac{P}{Pg}\right)^{-\frac{1}{k}} = V \quad \text{EQ 14}$$

And taking the first derivative of the following gives the leak rate:

Therefore, the leak rate is:

$$\frac{V}{RT}\frac{\Delta P}{\Delta t} = \frac{\Delta N}{\Delta t} \quad \text{EQ 15}$$

$$\frac{\partial LL}{\partial t} = Const\frac{\partial\left(\frac{P}{\Delta P}\right)}{\partial t} \quad \text{EQ 16}$$

and the second derivative:

$$\frac{\partial^2 LL}{\partial t^2} = Const\frac{\partial^2\left(\frac{P}{\Delta P}\right)}{\partial t^2} \quad \text{EQ 17}$$

gives the leak acceleration rate. If the calculation of EQ15 or EQ16 is zero, there is no leak.

The derivatives and integrals performed to calculated Equations 14-17 can be done with different methods, which may include Newton's forward, Newton's backward, centering algorithm, or other finite differencing or integration algorithms.

As a simplified but descriptive example, the closed containment system could be monitored for the measured parameters as previously described. Any deviation to the thermodynamic paths as defined in the above equation, i.e., (Equations 15-17, surpassing the predefined threshold for leak rate) would indicate a leak in the gas phase and or in the liquid phase. The leak rate for the liquid or gas is given by Equation 15 and Equation 16.

In a closed system, pressure can change with temperature but must follow the thermodynamic path as specified in Equation 14. If this equation is not followed, there is a system leak.

With an open system, such as a vapor vent or liquid flow of the contents, the leak rate can be detected by Equation 15 and Equation 16, both over time. The results would show values in excess of actual liquid or vent rate flows.

For open system leak detection, the vent rate and the process flow into or out of the system must be known. The liquid level is accurately measured by this apparatus through the use of Equation 11, regardless of any inlet or outlet flow rates.

Although Equations 14-17 can be used to determine a leak rate of a system, the same formulae can also be used to measure any rate of change in the volume of the liquid, For example, a scuba diver may wish to know the rate at which he is utilizing his oxygen supply, or a pilot may wish to know how fast he is using his aircraft fuel. Thus, the term "leak rate," as used herein, encompasses the rate of change of the fluid in the system, and need not be waster or otherwise discarded liquid material.

As a simplified but descriptive example, the closed containment system would be monitored for the measured parameters as previously described. Any deviation to the thermodynamic paths as defined in the above equation, i.e. (Equation 14, Equation 15, and Equation 16, surpassing the predefined threshold for leak rate) would indicate a leak in the gas phase and or in the liquid phase. The leak rate for the liquid or gas is given by Equation 15 and Equation 16.

In a closed system, pressure can change with temperature but must follow the thermodynamic path as specified in Equation 14. If this equation is not followed, there is a system leak. (use EQ14 with a not equal to sign).

With an open system, such as a vapor vent or liquid flow of the contents, the leak rate can be detected by Equation 15 and Equation 16, both over time. The results would show values in excess of actual liquid or vent rate flows.

For open system leak detection, the vent rate and the process flow into or out of the system must be known. The liquid level is accurately measured by this apparatus through the use of Equation 11, regardless of any inlet or outlet flow rates.

In a closed system, the steps could be as follows:
1. Monitor tank level as in Steps 1-9, above, followed by.
2. Pick a predefined leak rate threshold per a unit of time. For instance, this becomes the right side of Equation 14. This must be above the noise band of the liquid level measurement, but should be a minimum leak rate that can be tolerated. In a closed system, this value could be zero. Time can be fractions of a second to hours or days.
3. Use the instrumentation data from the steps described above to solve the equations (14, 15, or 16). There will be two numbers that may not be equal (one your leak rate, one your leak rate threshold).
4. If the calculated leak rate (left side of EQ14) is greater than your threshold, you have a leak and it is equal to the calculated value (left side of EQ14).

Steps for an open system are the same except the vent or flow rates must be accurately determined and accounted for in the leak rate threshold.

Although the present invention has been described in terms of specific embodiments, it will be apparent to one skilled in the art that various modifications may be made according to those embodiments without departing from the scope of the applied claims and their equivalents. Accordingly, the present invention should not be construed to be limited to the specific embodiments disclosed herein.

We claim:

1. A method for determining a liquid volume ($V_C$) in a container, said container containing at least one compressible gas and the liquid, independent of the shape of the container and any structures therein and independent of temperature, said method comprising:
producing a volumetric displacement ($\Delta V_G$) in the container, and measuring a pressure change ($\Delta P$) caused therein;
determining the liquid volume ($V_C$) with the following formula:

$$V_C = V_T - V_G$$

wherein:
$V_T$ is the reference container volume, and
$V_G$ is the gas volume measurement correlation (K P $\Delta V_G/\Delta P$), wherein K is in a range from 1 to $C_P/C_V$, wherein $C_P$ is the constant pressure heat capacity of the gas and $C_V$ is the constant volume heat capacity of the gas, wherein when said gas is a real gas, K equals $1+ZR/C_V$, wherein Z is the gas compressibility factor and R is the gas constant.

2. The method of claim 1, wherein when the method is isothermal, K equals 1.

3. The method of claim 1, wherein the volumetric displacement ($\Delta V_G$) occurs at a periodic (repeating) time.

4. The method of claim 3, wherein the volumetric displacement ($\Delta V_G$) and the periodic (repeating) time are constant values.

5. The method of claim 1, wherein the volumetric displacement ($\Delta V_G$) is constant and a repeating (pulse cycle) time varies.

6. The method of claim 1, wherein the volumetric displacement ($\Delta V_G$) varies and a repeating (pulse cycle) time is constant.

7. The method of claim 1, wherein said container is selected from the group consisting of terrestrial vehicles, orbital or space vehicles, and buildings.

8. A method for determining an unknown liquid volume ($V_C$) in a container, said container containing at least one compressible gas and a liquid, independent of the shape of the container and any structures therein, and independent of temperature, said method comprising:
producing a first volumetric displacement ($\Delta V_{G0}$) in the container at a known first fluid level ($V_{L0}$), and measuring a pressure change ($\Delta_{P0}$) from an initial pressure ($P_0$) caused therein;
producing a second volumetric displacement ($\Delta V_{G1}$) in the container at a known second fluid level ($V_{L1}$), wherein second fluid level is higher than said first fluid level, and measuring a pressure change ($\Delta P_1$) from an initial pressure ($P_1$) caused therein;
producing a third volumetric displacement ($\Delta V_G$) in the container at said unknown $V_C$, and
measuring a pressure change ($\Delta P$) from an initial pressure (P) caused therein;
calculating $V_C$ using the following formula:

$$V_C = V_{L1}(P_0/\Delta P_0 - P/\Delta P)/(P_0/\Delta P_0 - P_1/\Delta P_1).$$

9. The method of claim 8, wherein $V_{L0}$ is substantially equal to 0.

10. The method of claim 9, wherein $V_{L1}$ is substantially equal to the total volume of the container.

11. The method of claim 8, wherein $V_{L1}$ is substantially equal to the total volume of the container.

12. The method of claim 8, wherein said container is selected from the group consisting of terrestrial vehicles, orbital or space vehicles, and buildings.

13. The method of claim 8, wherein said container has a leakage of less than approximately 50% of the volume of the empty container.

14. A method for determining a leak rate $$\left(\frac{\partial LL}{\partial t}\right)$$

of liquid volume ($V_C$) in a container, said container containing at least one compressible gas and the liquid, independent of the shape of the container and any structures therein and independent of temperature, said method comprising:
producing a volumetric displacement ($\Delta V_G$) in the container, and measuring a pressure change ($\Delta P$) caused therein;

determining the liquid volume ($V_C$) with the following formula:

$$V_C = V_T + V_G$$

wherein:
- $V_T$ is the reference container volume, and
- $V_G$ is the gas volume measurement correlation (K P $\Delta V_G/\Delta P$), wherein K is in a range from 1 to $C_P/C_V$, wherein $C_P$ is the constant pressure heat capacity of the gas and $C_V$ is the constant volume heat capacity of the gas; P is the absolute pressure;

selecting a predefined leak rate, and solving at least one of the formulae selected from the group consisting of:

$$V_g \left(\frac{P}{P_g}\right)^{-\frac{1}{K}} = V \quad \text{EQ 14}$$

$$\frac{V}{RT}\frac{\Delta P}{\Delta t} = \frac{\Delta N}{\Delta t} \text{ and} \quad \text{EQ 15}$$

$$\frac{\partial LL}{\partial t} = Const \frac{\partial \left(\frac{P}{\Delta P}\right)}{\partial t}. \quad \text{EQ 16}$$

wherein Pg is pressure of gas phase, t is time, $\Delta t$ is a time period, N is compressibility factor of gas, Vg is the volume of gas T, is absolute temperature, R is the gas constant; and, Const is constant.

15. The method of claim 14, wherein the predetermined leak rate is zero.

16. The method of claim 14, wherein the predetermined leak rate is equal to a tolerable leak threshold for the container.

17. The method of claim 14, wherein the container is part of an open system.

\* \* \* \* \*